(12) United States Patent
Lee et al.

(10) Patent No.: US 9,489,942 B2
(45) Date of Patent: Nov. 8, 2016

(54) METHOD FOR RECOGNIZING STATISTICAL VOICE LANGUAGE

(71) Applicant: POSTECH ACADEMY-INDUSTRY FOUNDATION, Pohang-si, Gyeongsangbuk-do (KR)

(72) Inventors: Geun Bae Lee, Pohang-si (KR); Dong Hyeon Lee, Gyeongsangnam-do (KR); Seong Han Ryu, Seoul (KR); Yong Hee Kim, Seoul (KR)

(73) Assignee: POSTECH ACADEMY-INDUSTRY FOUNDATION, Pohang-si, Gyeongsangbuk-do (KR)

( * ) Notice: Subject to any disclaimer, the term of this patent is extended or adjusted under 35 U.S.C. 154(b) by 0 days.

(21) Appl. No.: 14/759,048

(22) PCT Filed: Sep. 6, 2013

(86) PCT No.: PCT/KR2013/008092
§ 371 (c)(1),
(2) Date: Jul. 2, 2015

(87) PCT Pub. No.: WO2014/106979
PCT Pub. Date: Jul. 10, 2014

(65) Prior Publication Data
US 2015/0356969 A1    Dec. 10, 2015

(30) Foreign Application Priority Data
Jan. 2, 2013    (KR) .................. 10-2013-0000188

(51) Int. Cl.
*G10L 15/14*    (2006.01)
*G10L 15/06*    (2013.01)
(Continued)

(52) U.S. Cl.
CPC ............... *G10L 15/14* (2013.01); *G10L 15/06* (2013.01); *G10L 15/1822* (2013.01); *G10L 15/197* (2013.01); *G10L 15/063* (2013.01); *G10L 2015/0631* (2013.01)

(58) Field of Classification Search
CPC ..... G10L 15/14; G10L 15/06; G10L 15/197; G10L 15/1822; G10L 2015/0631; G10L 15/063
USPC .................................................. 704/245–257
See application file for complete search history.

(56) References Cited

U.S. PATENT DOCUMENTS

| 8,682,666 B2 | 3/2014 | Degani et al. |
| 2003/0061054 A1 | 3/2003 | Payne et al. |

(Continued)

FOREIGN PATENT DOCUMENTS

| JP | 2004-086001 A | 3/2004 |
| JP | 2008-058341 A | 3/2008 |

(Continued)

OTHER PUBLICATIONS

International Search Report mailed Dec. 16, 2013; PCT/KR2013/008092.

*Primary Examiner* — Marcellus Augustin
(74) *Attorney, Agent, or Firm* — Ladas & Parry LLP

(57) ABSTRACT

The present invention is a method for recognizing a statistical voice language using a statistical technique without using a manually tagged corpus. The method comprises: a dialog act clustering step of clustering speech utterances of sentences based on similar dialog acts; a named entity clustering step of extracting a named entity candidate group from the result of the dialog act clustering step and clustering named entities based on the neighboring contextual information of the extracted named entity candidate group; and a main act clustering step of clustering main acts for each region based on the clustered dialog acts and named entity.

14 Claims, 8 Drawing Sheets

(51) Int. Cl.
*G10L 15/18* (2013.01)
*G10L 15/197* (2013.01)

(56) References Cited

U.S. PATENT DOCUMENTS

2004/0102957 A1* 5/2004 Levin ................ G06F 17/2735
704/3

2014/0181214 A1* 6/2014 Price ..................... G06F 9/5066
709/205

FOREIGN PATENT DOCUMENTS

| KR | 100776729 B1 | 11/2007 |
|----|--------------|---------|
| KR | 20110043600 A | 4/2011 |

* cited by examiner

| INPUT SENTENCE | LET ME KNOW PHONE NUMBER OF AUDITORIUM |
|---|---|
| SEMANTIC STRUCTURE | DIALGO ACT = *'REQUEST'*<br>MAIN ACT = *'SEARCH_PHONE'*<br>NAMED ENTITY [ROOM_NAME] = *'AUDITORIUM'* |

FIG. 5

$\beta \sim \text{GEM}(\alpha)$
$\omega \sim \text{Dir}(\omega_0)$
for each hidden state $k \in [1,2,...]$
    $\pi_k \sim \text{DP}(\alpha', \beta)$
    $\phi_k \sim \text{Dir}(\phi_0)$
for each dialog set $m$
    $\lambda_m \sim \text{Dir}(\lambda_0)$
    $\psi_m \sim \text{Dir}(\psi_0)$
    for each dialog $d$
        for each time stamp $t$
            $z_t \sim \text{Multi}(\pi_{z_{t-1}})$ [sample dialog act]
            for each word $w$
                $x_i \sim \text{Multi}(\lambda_m)$ [select word type]
                if $x_i=1$
                    $w_i \sim \text{Multi}(\phi_{z_i})$ [sample word ≈ action model]
                else if $x_i=2$
                    $w_i \sim \text{Multi}(\psi_m)$ [sample word ≈ domain model]
                else if $x_i=0$
                    $w_i \sim \text{Multi}(\omega)$ [sample word ≈ background model]

| WORD | Guide | me | to | a | second | floor | video | classroom |
|---|---|---|---|---|---|---|---|---|
| SOURCE OF WORD | 0 | 0 | 1 | 1 | 2 | 2 | 2 | 2 |
| NAMED ENTITY | | | | | LOC_FLOOR | | LOC_ROOM_NAME | |

FIG. 10

$\beta \sim \text{GEM}(\alpha)$
$\omega \sim \text{Dir}(\omega_0)$
$\lambda \sim \text{Beta}(\lambda_0)$ for each hidden state $k \in [1,2,...]$
    $\pi_k \sim \text{DP}(\alpha', \beta)$
    $\phi_k \sim \text{Dir}(\phi_0)$
    $\theta_k \sim \text{Dir}(\theta_0)$
    $\psi_k \sim \text{Dir}(\psi_0)$ for each dialog $d$
    for each time stamp $t$
        $z_t \sim \text{Multi}(\pi_{z_{t-1}})$ [sample main act]
        $s_t \sim \text{Multi}(\psi_{z_t})$ [sample system act]
        for each entity $e$
            $e_j \sim \text{Multi}(\theta_{z_t})$ [sample entity]
        for each word $w$
            $x_i \sim \text{Bem}(\lambda)$ [select word type]
            if $x_i = 1$
                $w_i \sim \text{Multi}(\phi_{z_t})$ [sample word $\approx$ act LM]
            else if $x_i = 0$
                $w_i \sim \text{Multi}(\omega)$ [sample word $\approx$ background model]

METHOD FOR RECOGNIZING STATISTICAL VOICE LANGUAGE

TECHNICAL FIELD

The present invention relates to a method for understating speech language, and more particularly, a method for performing speech language understanding, which is one of important factors in a dialog system, using a statistical scheme without using a manually tagged corpus.

BACKGROUND ART

Speech language understanding refers to analyzing utterances subjected to speech recognition, and extracting slots according to a semantic structure. The speech language understanding plays a key role in various natural language processing systems, such as a dialog system.

In general, speech language understanding for a dialog system uses a semantic structure based on three factors of a dialog act, a main act and a named entity.

A dialog act represents an intention of an utterance independent of a domain, and is tagged based on a sentence represented in the utterance. A main act represents an intention of an utterance dependent on a domain, and is tagged based on a function. A named entity represents a word having a meaning that is needed to perform a function. For each sentence, one dialog act and one main act exist, and the named entity, which is applied to each word, may be none or at least one.

FIG. 1 illustrates an example of a semantic structure extracted from a spoken sentence in speech language understanding.

Referring to FIG. 1, for an input sentence ('let me know phone number of auditorium'), a dialog act is 'request', a main act is 'search_phone', and a named entity is 'auditorium.'

However, in order to develop the speech language understanding, labels for the dialog act, the main act and the named entity need to be designed. The label designing needs to be repeated for domains in which speech language understanding is performed. In addition, in order to generate a model for speech language understanding, a collected corpus needs to be tagged by referring to the label designing. The tagging process requires a great amount of expense.

FIG. 2 is a flowchart showing a process of tagging a corpus for speech language understanding.

Referring to FIG. 2, developing the conventional language understanding technology includes defining a domain to which the language understanding is applied (S210), collecting a corpus according to the defined domain (S220), designing labels for a dialog act/a main act/a named entity (S230) and performing a tagging task (S240).

The tagged corpus is learned by a trainer (S250) and a model 200 is created from the trainer. The created model 200 is used in a language understanding module.

The processes of label designing and tagging require the labor of people, and it is referred to as a manual tagging task.

DISCLOSURE

Technical Problem

The present invention is directed to providing a statistical method for speech language understanding capable of omitting tasks of label designing and tagging, which are required in a conventional method for speech language understanding, for dialog act/main act/named entity for respective corpuses collected in various domains.

Technical Solution

One aspect of the present invention provides a statistical method for speech language understanding sequentially including dialog act clustering including clustering spoken sentences based on similar dialog acts included in the spoken sentences, named entity clustering including extracting a group of named entity candidates from a result of the dialog act clustering, and clustering named entities based on context information around the extracted group of candidate named entities, and main act clustering including clustering main acts for each domain based on a result of the named entity clustering.

The statistical method for speech language understanding may be performed based on a nonparametric and unsupervised learning method, without using artificial manual tagging.

The dialog act clustering may be performed using a non-parametric Bayesian hidden Markov model, under conditions that the dialog act is a hidden state and words included in the spoken sentences are observation values.

The non-parametric Bayesian hidden Markov model may be a hierarchical Dirichlet process hidden Markov model (HDP-HMM).

A transition probability of the dialog act may be determined by a Dirichlet process.

In the dialog act clustering, the dialog act clustering may be performed using sources of the words included in the spoken sentences, under conditions that the dialog act is a hidden state and the words are observation values.

In the dialog act clustering, the dialog act may be finally inferred using Gibbs sampling.

The statistical method for speech language understanding may further include classifying domains of the spoken sentences using a distribution of domain-specific words that is obtained in the dialog act clustering.

In the named entity clustering, a group of candidate named entities may be extracted using sources of words included in the spoken sentences.

When the group of candidate named entities includes a plurality of consecutive words, the plurality of consecutive words may be segmented using a stickiness function.

The stickiness function may be a point mutual information (PMI) function.

The context information around the extracted group of candidate named entities may be obtained by applying a hierarchical Dirichlet process algorithm on a predetermined number of words positioned before and after the extracted group of the named entity candidates.

The main act clustering may be performed using a non-parametric Bayesian hidden Markov model, under conditions that the main act is a hidden state and words included in the spoken sentences, named entities extracted from the spoken sentences and system activities corresponding to the spoken sentences are observation values.

The non-parametric Bayesian hidden Markov model may be a hierarchical Dirichlet process hidden Markov model.

A transition probability of the main act may be determined by a Dirichlet process.

The statistical method for speech language understanding may further include generating an agenda graph using main acts derived from the main act clustering and the transition probability.

Advantageous Effects

The statistical method for speech language understanding according to the present invention enables statistical speech understanding without manual tagging. That is, the statistical method for speech language understanding according to the present invention can automatically perform tagging tasks of dialog act/main act/named entity, which are required for the speech language understanding. Accordingly, the development cost of speech language understanding in a multi-domain dialog system can be remarkably reduced. In addition, a distribution of domain-specific words and an agenda graph that are obtained in the above process can be used in a domain classifier and a dialog system, respectively.

DESCRIPTION OF DRAWINGS

FIG. 5 is a pseudo-code illustrating the entire generative story of dialog act clustering according to the embodiment of the present invention.

FIG. 10 is a pseudo-code illustrating the entire generative story of main act clustering according to the embodiment of the present invention.

MODES OF THE INVENTION

Figures 1, 2:
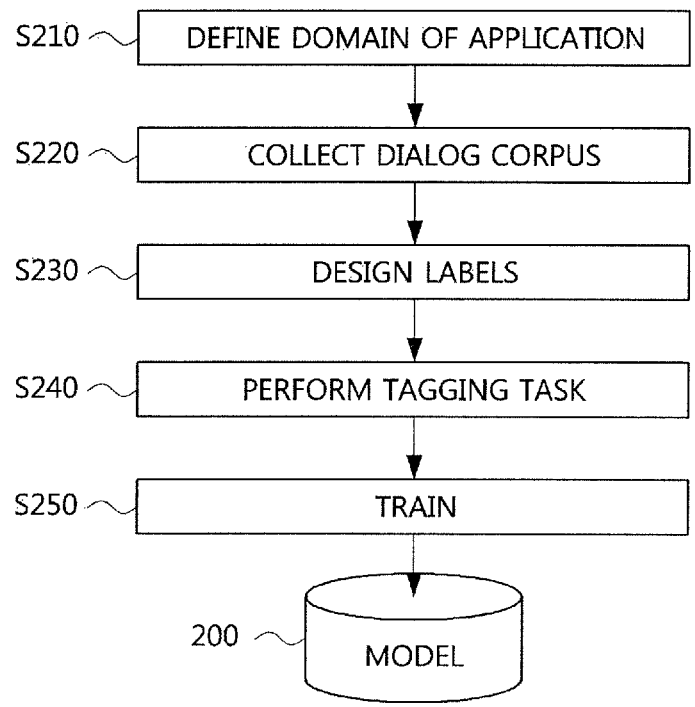
FIG. 1 is a view illustrating a semantic structure extracted from a spoken sentence in speech language understanding.
FIG. 2 is a flowchart showing a process of tagging a corpus for speech language understanding.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms "first," "second," "A," "B," etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred example embodiments of the present invention will be described in detail with reference to the accompanying drawings. The same elements may have the same reference numerals to provide a better understanding of the specification, and the details of elements identical will be omitted in order to avoid redundancy.

As described through the conventional art, a dialog corpus is collected for a given domain, and includes user utterances and system activities.

According to the conventional art, a dialog act, a main act and a named entity are directly tagged to a user utterance by a person. Examples of the dialog corpus are shown below. In the following examples, '<', '>' represent a named entity, and a word in bold represents the need to be tagged by a person.

User utterance: I am looking for the president's room <PERSON> Young il Yeom </PERSON>.
    ⇒ dialog act: statement, main act: search_per_loc,
    system activity: inform_P(RoomNumber)
User utterance: What is the room number? <ROOMNUM> 201 </ROOMNUM>?
    ⇒ dialog act: wh_question, main act: search_loc,
    system activity: inform_B(Position)
User utterance: Please guide me to the room <ROOMNUM> 201 </ROOMNUM>.
    ⇒ dialog act: request, main act: guide_loc,
    system activity: guide( )

Figure 3:
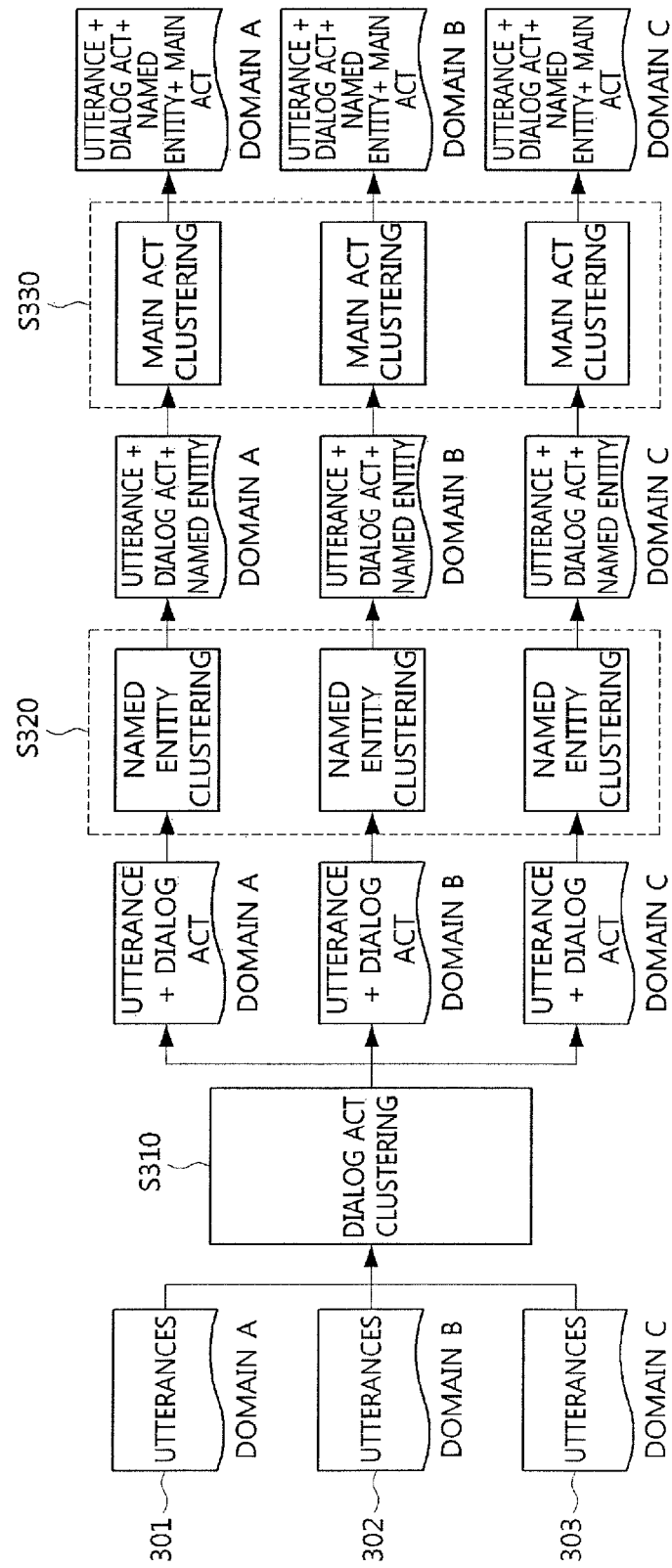
FIG. 3 is a conceptual diagram illustrating a statistical speech language understanding method without using manual tagging according to an embodiment of the present invention.

FIG. 3 is a conceptual diagram illustrating a statistical method for speech language understanding without manual tagging according to an embodiment of the present invention.

Referring to FIG. 3, a statistical speech language understanding without manual tagging according to the embodiment of the present invention includes three operations (a first operation—dialog act clustering, a second operation—named entity clustering, and a third operation—main act clustering).

In the first operation (S310) of performing dialog act clustering, spoken sentences 301 to 303 are clustered based on similar dialog acts included in the spoken sentences. Since a dialog act represents domain-independent sentence intention, corpuses of a plurality of domains are simultaneously clustered.

In the second operation (S320) of performing named entity clustering, a group of candidate named entities is extracted from a result of the dialog act clustering, and named entities are clustered according to domains using context information around the group of candidate named entities.

In the third operation (S330) of performing main act clustering, main acts are clustered according to domains using named entities and system activities as features.

In the first to third operations, a result of one operation is used in the next operation, so the three operations need to be consecutively performed.

Hereinafter, each of the above operations will be described in detail.

1) Dialog Act Clustering

Figure 4:
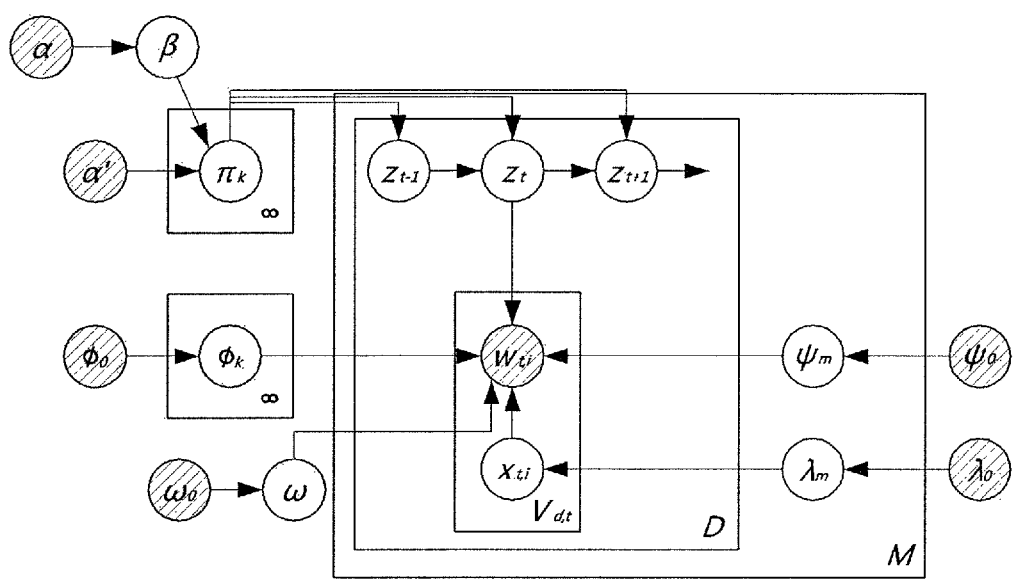
FIG. 4 is a conceptual diagram illustrating a model for dialog act clustering in a statistical method for speech language understanding according to the embodiment of the present invention.

FIG. 4 is a conceptual diagram illustrating a model for dialog act clustering in a statistical speech language understanding method according to the embodiment of the present invention.

The model is obtained based on a non-parametric Bayesian hidden Markov model. As an example of the non-parametric Bayesian hidden Markov model, a hierarchical Dirichlet process hidden Markov model (HDP-HMM) may be used. In this case, the number of states is assumed to be infinite.

The Hidden Markov Model is a generative model, in which each dialog act is assumed to generate a sentence. That is, it is assumed that a dialog act is a hidden state, and words included in a sentence are observation values. In FIG. 4, z represents a dialog act, and w represents a word. That is, it is assumed that z generates a plurality of words w included in a sentence.

For a transition probability $\pi k$ of a dialog act, Dirichlet Process DP ($\alpha'$, $\beta$) is used as a prior distribution.

The Dirichlet Process needs to be given a hyperparameter $\alpha'$ and a base distribution $\beta$. The base distribution $\beta$ is generated from GEM distribution that is known as stick-breaking construction. GEM distribution needs to be given a hyperparameter $\alpha$. In this manner, HMM (Hidden Markov Model) is defined in an infinite domain. A transition probability of a dialog act is defined as Equation 1 shown below.

$$P(z_t | z_{-t}, \alpha', \beta) = \frac{n(z_{t-1}, z_t) + \alpha'}{\sum_{t'} n(z_{t-1}, z_{t'}) + \beta_{z_t} \alpha'} \quad \text{[Equation 1]}$$

$n(\cdot)$ represents the number of simultaneous occurrences in a training corpus.

A hidden variable x is added to each word such that only the words having influence on a dialog act are considered. x represents a source of a word. x is selected from three values including 0, 1 and 2. Value 0 represents a word related to a dialog act, value 1 represents a word that normally occurs (for example, a particle), and value 2 represents a word related to a domain. The source distribution of a word $\lambda m$ is defined as Equation 2 below.

$$P(x_{t,i} | z, x_{-(t,i)}, w, e, \lambda_0) \propto \frac{n(x_{t,i}, w_{t,i}) + \lambda_0}{\sum_{t',i'} n(x_{t',i'}, w_{t,i}) + |V|\lambda_0} \quad \text{[Equation 2]}$$

As for the probability of each word, depending on the source of a word, the distribution probability of dialog act-specific words is defined as Equation 3 below, the distribution probability of general words is defined as Equation 4 below, and the distribution probability of domain-specific words is defined as Equation 5 below.

$$P(w_{t,i} | z, x_{t,i} = 0, w_{-(t,i)}, e, \phi_0) = \frac{n(z_t, w_{t,i}) + \phi_0}{\sum_{i'} n(z_t, w_{t,i'}) + |V|\phi_0} \quad \text{[Equation 3]}$$

$$P(w_{t,i} | z, x_{t,i} = 1, w_{-(t,i)}, e, \omega_0) = \frac{n(x_t, w_{t,i}) + \omega_0}{\sum_{t',i'} n(x_{t',i'} = 1, w_{t',i'}) + |V|\omega_0} \quad \text{[Equation 4]}$$

$$P(w_{t,i} | z, x_{t,i} = 2, w_{-(t,i)}, e, \psi_0) = \frac{n(x_{t,i}, w_{t,i}) + \psi_0}{\sum_{t',i'} n(x_{t',i'} = 2, w_{t',i'}) + |V|\psi_0} \quad \text{[Equation 5]}$$

Finally, the inference of a dialog act is achieved through Gibbs Sampling, and a dialog act z is sampled based on posterior distributions shown in Equation 6 below.

$$P(z_t | z_{-t}, x, w, e) \propto P(z_t | z_{-t}) \prod_{i=1}^{V_{d,t}} P(w_{t,i} | z, x, w_{-(t,i)}, e) \quad \text{[Equation 6]}$$

FIG. 5 is a pseudo-code illustrating the entire generative story of dialog act clustering according to the embodiment of the present invention.

2) Named Entity Clustering

In the named entity clustering, a group of candidate named entities is extracted prior to full-scale named entity clustering. To this end, a source value of each word (x) in the dialog act clustering is used.

Figures 6, 7:
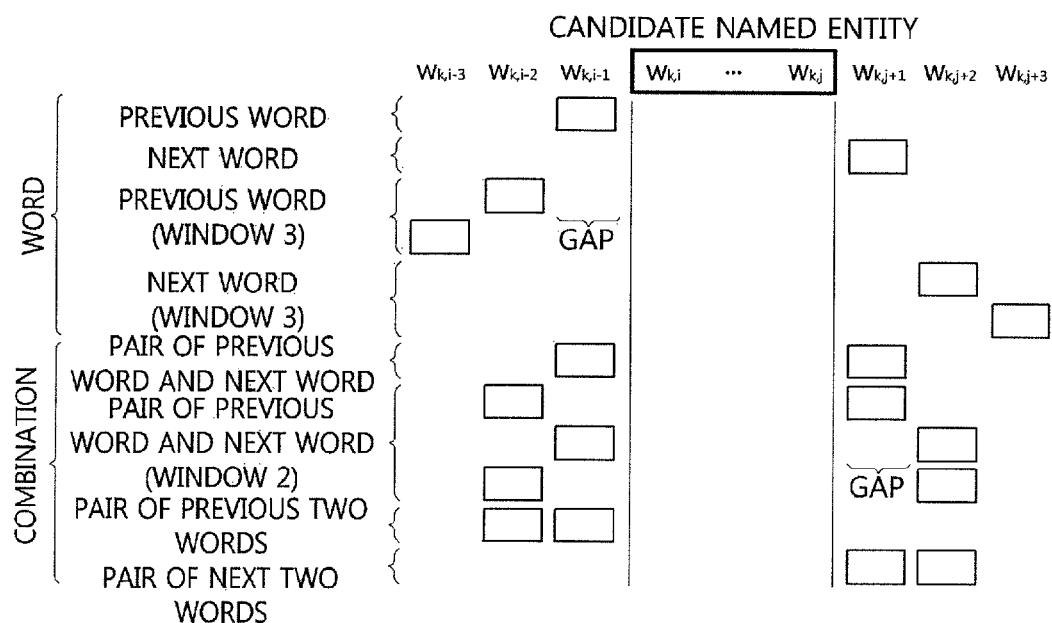
FIG. 6 is a conceptual diagram illustrating the concept of extracting a group of candidate named entities from a result of the dialog act clustering in named entity clustering according to the embodiment of the present invention.
FIG. 7 is a conceptual diagram illustrating the concept of extracting context information of candidate named entities in named entity clustering according to the embodiment of the present invention.

FIG. 6 is a conceptual diagram illustrating the concept of extracting a group of candidate named entities from a result of the dialog act clustering in named entity clustering according to the embodiment of the present invention.

Referring to the example in FIG. 6, words determined as domain words 'second, floor, video and classroom' (that is, words having a source value of 2) are taken as candidate named entities. Shown below the words are named entities that are manually tagged.

However, as shown in FIG. 6, a plurality of words may serve as one candidate named entity. Accordingly, the consecutive words are regarded as a temporary candidate named entity and subject to segmentation.

For example, when a candidate named entity t is divided into m consecutive named entities, the optimum result of segmentation is found using a stickiness function having the highest value. As an example of the stickiness function, point mutual information (PMI) may be used. Equations 7 to 9 described below are provided to illustrate the definition of a stickiness function of a candidate named entity and the process of finding a candidate named entity having the highest stickiness function value.

$$\arg\max_{s_1 \cdots s_m} \text{Stickiness}(t) = \arg\max_{s_1 \cdots s_m} \sum_{i=1}^{m} \text{Stickiness}(s_i) \quad \text{[Equation 7]}$$

$$PMI(s) = \log \frac{Pr(w_1 \ldots w_n)}{\frac{1}{n-1} \sum_{i=1}^{n-1} Pr(w_1 \ldots w_i) Pr(w_{i+1} \ldots w_n)} \quad \text{[Equation 8]}$$

$$\text{Stickiness}(s) = \frac{1}{1 + e^{-PMI(s)}} \quad \text{[Equation 9]}$$

When a final candidate named entity is determined through the above process, context information of the candidate named entity is extracted. The context information may be obtained using a predetermined number of words positioned before and after the candidate named entity. For example, the context information may be composed of three words positioned before the candidate named entity and three words positioned after the candidate named entity when a window has a size of 3.

FIG. 7 is a conceptual diagram illustrating the concept of extracting context information of candidate named entities in named entity clustering according to the embodiment of the present invention.

In extracting context information, it may be assumed that context information is generated from a group of candidate named entities, and a hierarchical Dirichlet process (HDP) may be applied to each domain.

Meanwhile, the named entity clustering is performed without using a transition probability or a source, which is different from the dialog act clustering.

Figure 8:
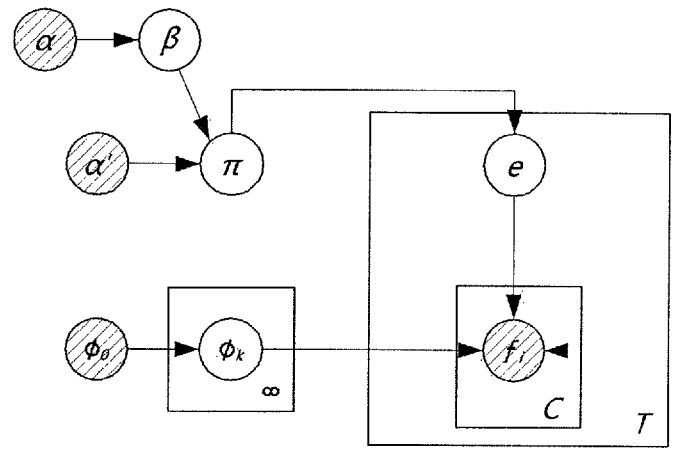
FIG. 8 is a conceptual diagram illustrating a model for named entity clustering in a statistical method for speech language understanding according to the embodiment of the present invention.

FIG. 8 is a conceptual diagram illustrating a model for named entity clustering in a statistical speech language understanding method according to the embodiment of the present invention.

In FIG. 8, e represents a candidate named entity, and f represents context information.

3) Main Act Clustering

The main act clustering is similar to the dialog act clustering as being performed in units of utterances, but is different from the dialog act clustering by being performed in each of the domains and using a named entity and a system activity distribution.

Figure 9:
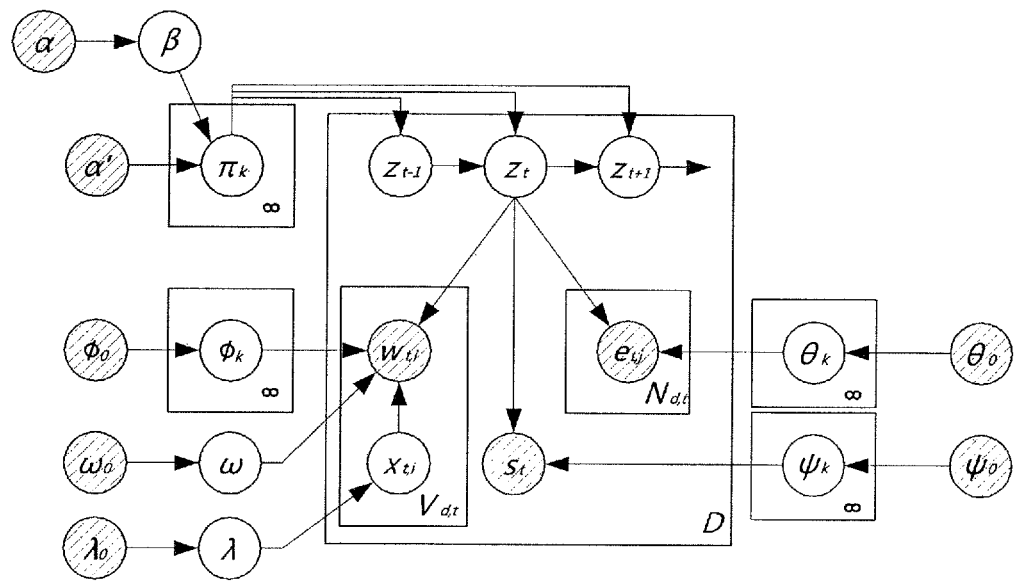
FIG. 9 is a conceptual diagram illustrating a model for main act clustering in a statistical method for speech language understanding according to the embodiment of the present invention.

FIG. 9 is a conceptual diagram illustrating a model for main act clustering in a statistical speech language understanding method according to the embodiment of the present invention.

Each variable illustrated in FIG. 9 has a meaning similar to that described in the dialog act clustering.

A main act is represented by z. Since the main act clustering is performed within a domain, x is selected from two values of 0 and 1. Value 0 represents a word related to a dialog act, and value 1 represents a word that normally occurs, for example, a particle.

A named entity shown in an utterance is represented by e, and $\theta k$ represents a named entity distribution for a main act k. A system activity corresponding to an utterance is represented by s, and $\psi k$ represents a system activity distribution for the main act k.

The respective distributions are calculated in Equation 10 and Equation 11 shown below.

$$P(e_{t,j} \mid z, x, w, e_{-(t,j)}, s, \theta_0) = \frac{n(z_t, e_{t,j}) + \theta_0}{\sum_{j'} n(z_t, e_{t,j'}) + |N|\theta_0} \quad \text{[Equation 10]}$$

$$P(e_{t,j} \mid z, x, w, e, s_{-t}, \psi_0) = \frac{n(z_t, s_t) + \psi_0}{\sum_{t'} n(z_t, s_{t'}) + |S|\psi_0} \quad \text{[Equation 11]}$$

Finally, the inference of a main act is achieved through Gibbs Sampling, and a main act z is sampled based on a posterior distribution.

$$P(z_t \mid z_{-t}, x, w, e, s) \propto P(z_t \mid z_{-t}) P(s_t \mid z, x, w, e, s_{-t}) \quad \text{[Equation 12]}$$

$$\prod_{i=1}^{V_{d,t}} P(w_{t,i} \mid z, x, w_{-(t,i)}, e, s) \prod_{j=1}^{N_{d,t}} P(e_{t,j} \mid z, x, w, e_{-(t,j)}, s)$$

FIG. 10 is a pseudo-code illustrating the entire generative story of main act clustering according to the embodiment of the present invention.

A method of using clustering results is provided as follows.

As the dialog act clustering, the named entity clustering and the main act clustering described above are consecutively performed, dialog act tagging, named entity tagging and main act tagging are automatically added to a dialog corpus. Tagging labels are assigned temporary cluster IDs according to the clustering results, and in order to convert the ID to be identified by a person, ID numbers are collectively substituted with labels having meanings through partial analysis of the tagging labels. However, when the tagging is provided only for distinction in a dialog system using a dialog act, a named entity and a main act, the substituting process is not needed.

A multi-domain dialog system requires a domain classifier to identify a domain to which an utterance belongs. The distribution of domain-specific words obtained as a result of the dialog act clustering may be used in the domain classifier. Probabilities in which each word included in a sentence is shown in a domain are calculated and are multiplied for each domain, so that a domain having the highest probability in the sentence is selected.

A dialog system may use an agenda graph representing a task flow. When main acts in the main clustering are determined as sub-tasks, and transition probabilities of the main acts are used, an agenda graph may be automatically generated. When the distribution of named entities is applied, not only a named entity shown in a corresponding utterance but also differentiation of named entities accumulated from the start of a dialog to a present point in time may be used so as to obtain a result of approximating the sub tasks rather than the main acts.

Figure 11:
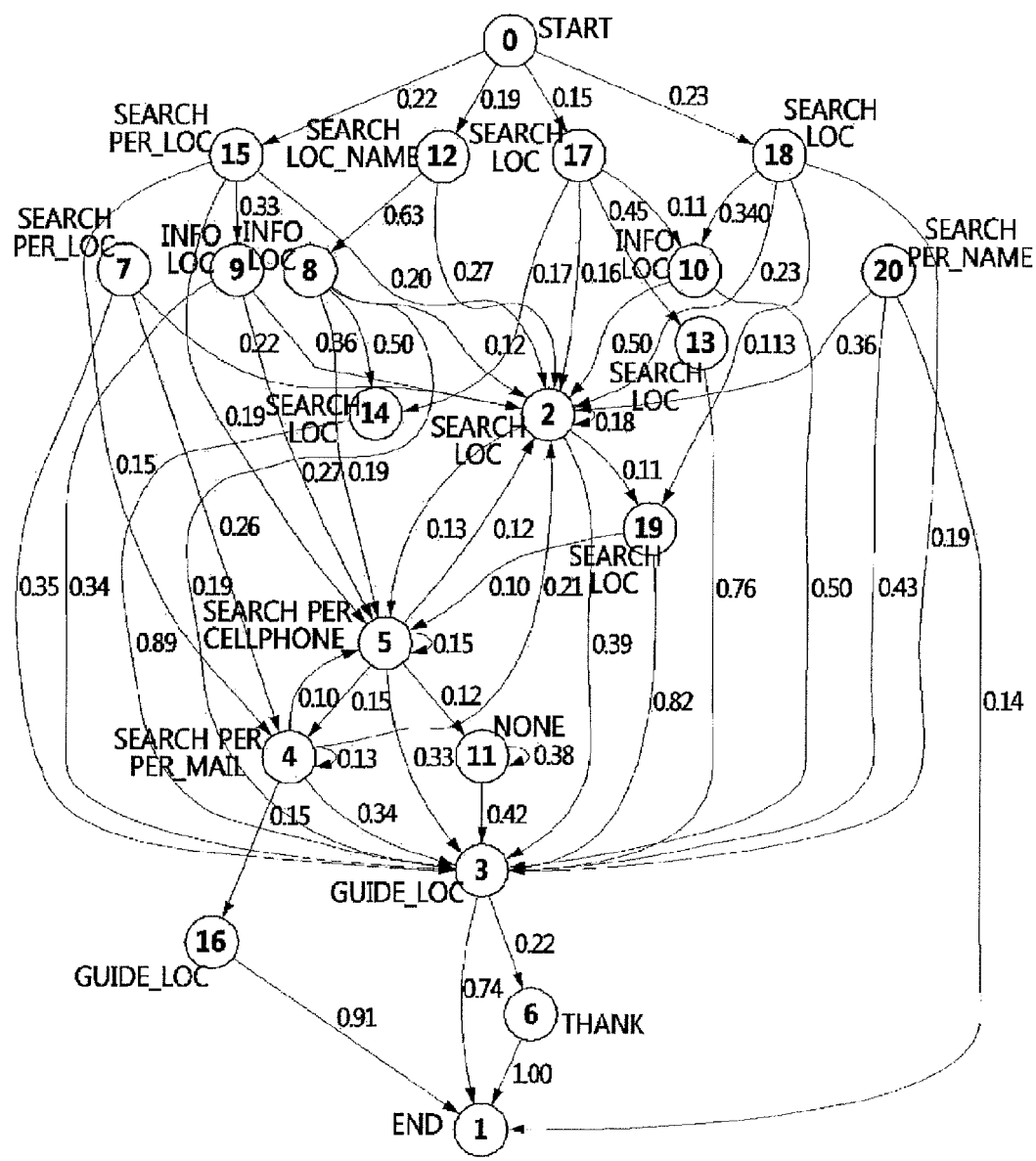
FIG. 11 is a view illustrating an example of an agenda graph based on a result of main act clustering according to the embodiment of the present invention.

FIG. 11 is a view illustrating an example of an agenda graph based on a result of main act clustering according to the embodiment of the present invention.

Referring to FIG. 11, the number of a node represents a cluster ID obtained through clustering, and the number marked on an arrow represents a transition probability. A label denoted at a side of the node number is provided for reference, and indicates a main act that may be shown according to manual tagging.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A computerized statistical method for speech language understanding, performed by a processor in a computing apparatus, sequentially comprising:
    dialog act clustering including clustering spoken sentences based on similar dialog acts included in the spoken sentences;
    named entity clustering including extracting a group of named entity candidates from a result of the dialog act clustering, and clustering named entities based on context information around the extracted group of candidate named entities; and
    main act clustering including clustering main acts for each domain based on a result of the named entity clustering,
    wherein the named entity clustering extracts a group of candidate named entities using sources of words included in the spoken sentences,
    wherein when the group of candidate named entities includes a plurality of consecutive words, the plurality of consecutive words are segmented using a stickiness function.

2. The method of claim 1, wherein the method is performed based on a nonparametric and unsupervised learning method, without using contrived manual tagging.

3. The method of claim 1, wherein the dialog act clustering is performed using a non-parametric Bayesian hidden Markov model, under conditions that the dialog act is a hidden state and words included in the spoken sentences are observation values.

4. The method of claim 3, wherein the non-parametric Bayesian hidden Markov model is a hierarchical Dirichlet process hidden Markov model (HDP-HMM).

5. The method of claim 4, wherein a transition probability of the dialog act is determined by a Dirichlet process.

6. The method of claim 3, wherein in the dialog act clustering, the dialog act clustering is performed using sources of the words included in the spoken sentences, under conditions that the dialog act is a hidden state and the words are observation values.

7. The method of claim 3, wherein the dialog act clustering finally infers the dialog act using Gibbs sampling.

8. The method of claim 1, further comprising classifying domains of the spoken sentences using a distribution of domain-specific words that is obtained in the dialog act clustering.

9. The method of claim 1, wherein the stickiness function is a point mutual information (PMI) function.

10. The method of claim 1, wherein the context information around the extracted group of candidate named entities is obtained by applying a hierarchical Dirichlet process algorithm to a predetermined number of words positioned before and after the extracted group of the named entity candidates.

11. The method of claim 1, wherein the main act clustering is performed using a non-parametric Bayesian hidden Markov model, under conditions that the main act is a hidden state and words included in the spoken sentences, named entities extracted from the spoken sentences and system activities corresponding to the spoken sentences are observation values.

12. The method of claim 11, wherein the non-parametric Bayesian hidden Markov model is a hierarchical Dirichlet process hidden Markov model.

13. The method of claim 12, wherein a transition probability of the main act is determined by a Dirichlet process.

14. The method of claim 13, further comprising generating an agenda graph using main acts derived from the main act clustering and the transition probability.

* * * * *